United States Patent [19]

Giles, Jr.

[11] Patent Number: 4,873,133

[45] Date of Patent: Oct. 10, 1989

[54] FIBER REINFORCED STAMPABLE THERMOPLASTIC SHEET

[75] Inventor: Harold F. Giles, Jr., Cheshire, Mass.

[73] Assignee: General Electric Company, Pittsfield, Mass.

[21] Appl. No.: 905,995

[22] Filed: Sep. 11, 1986

[51] Int. Cl.⁴ .......................... B32B 5/06; B32B 5/12; B32B 17/04; B32B 27/12; B32B 31/20

[52] U.S. Cl. .................................. 428/107; 428/34.5; 428/34.7; 428/36.1; 428/36.2; 428/109; 428/113; 428/285; 428/286; 428/287; 428/288; 428/300; 428/301; 428/303; 428/340; 428/408; 428/412; 428/902; 264/258; 264/299

[58] Field of Search ............... 428/107, 109, 113, 285, 428/286, 287, 288, 300, 301, 303, 340, 408, 412, 902

[56] References Cited

U.S. PATENT DOCUMENTS

| 4,044,188 | 8/1977 | Segal | 428/283 |
| 4,098,943 | 7/1978 | Degginger | 428/283 |
| 4,145,227 | 3/1979 | Segal . | |
| 4,269,884 | 5/1981 | Della Vecchia | 428/283 |
| 4,379,801 | 4/1983 | Weaver et al. | 428/283 |
| 4,379,802 | 4/1983 | Weaver et al. | 428/283 |
| 4,471,018 | 9/1984 | Kritchevsky et al. | 428/268 |
| 4,716,072 | 12/1987 | Kim | 428/251 |

Primary Examiner—James C. Cannon
Attorney, Agent, or Firm—Spencer D. Conard

[57] ABSTRACT

Fiber reinforced thermoplastic articles having an improved surface are produced in a stampable sheet which is produced from a reinforcing fiber mat having a thermoplastic support film.

18 Claims, 1 Drawing Sheet

FIBER REINFORCED STAMPABLE THERMOPLASTIC SHEET

The present invention relates to fiber reinforced stampable thermoplastic sheets. More particularly, the present invention relates to such sheets which are formable into shaped objects having improved surface characteristics.

BACKGROUND OF THE INVENTION

Shaped objects from fiber reinforced stampable sheet are well known. Broadly, stampable sheet is a composite obtained by a laminating process wherein a reinforcing fiber mat and or layer of thermoplastic resin are pressed together at temperatures above thermoplastic melt. In the stamping operation, the stampable sheet is deformed under pressure at temperatures below thermoplastic melt to form a shaped object.

A major problem associated with the laminating process is in obtaining smooth surfaces from the forming process. This is particularly difficult where either high concentrations of glass fiber are utilized or chopped glass fibers are employed. Fiber strands protruding from the surface will roughen the stampable sheet. This poor surface quality in the stampable sheet will be transferred into the finished shaped object. There is a continuing effort by those skilled in the art to enhance the surface characteristics of these finished stamped parts.

A method for improving the surface quality of stampable sheet is to use a resin layer containing short glass fiber or a mineral filler external to a resin layer containing long glass fibers. This method and variations thereof are disclosed in U.S. Pat. Nos. 4,044,188; 4,098,943; 4,145,227; and 4,269,884. The products of these methods suffer in that they contain a layer which does not benefit from the use of long glass fiber.

Another method to improve surface quality is the use of a fabric surface veil positioned between an external layer of resin and an internal layer of resin containing long glass fibers. This method is disclosed in U.S. Pat. Nos. 4,379,801 and 4,471,018. The products of this method also suffer in that an external layer of resin contains no reinforcing fiber and therefore, the fiber network is not continuous.

It is an object of the present invention to produce a fiber reinforced stampable sheet which has smoother surfaces and which will maintain this smoothness when stamped into finished articles.

It is another object of the present invention to produce a stampable sheet with a reinforcing fiber mat wherein said fibers are internally positioned by the use of a support film.

It is a further object of this invention to provide a fiber reinforced stampable sheet having smooth surfaces wherein the fiber network is continuous and contains long glass fibers.

DETAILED DESCRIPTION OF THE INVENTION

There is provided by the present invention a fiber reinforced stampable sheet formable into smooth shaped objects in a stamping process. This stampable sheet is obtained by laminating (a) a thermoplastic resin layer and (b) a reinforcing fiber mat comprising fibers supported by a thermoplastic resin film.

In particular embodiments of this invention, the fibers are disproportionately distributed on each side of the thermoplastic resin support film with a major portion of the fibers positioned on one side of said thermoplastic resin film, preferably 85 to 99% by weight, and a minor portion is positioned on the opposite side, preferably 1 to 15% by weight. In the preferred embodiments of this invention, the side of the thermoplastic film having the minor portion of fibers is adjacent the thermoplastic resin layer during lamination.

The preferred embodiments of this invention consist of a stampable sheet having at least one external surface of improved smoothness, i.e., that surface formed on the side of the support film having a minor portion of fibers, and one surface of standard smoothness, i.e., that surface formed on the side of the support film having a major portion of fibers. The combination of thermoplastic resin layer and reinforcing fiber mat can be repeated to produce a structure wherein both surfaces are of improved smoothness, i.e., two support films, with adjacent thermoplastic resin layers, are positioned to provide the side having a minor portion of fibers at each external surface.

Figure 1:
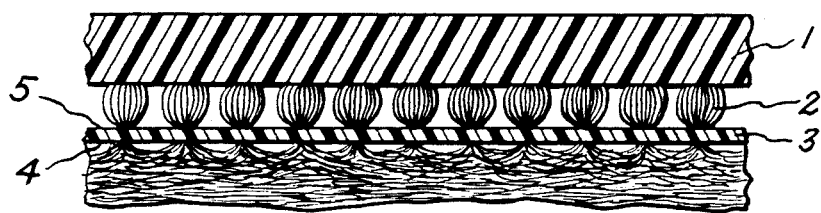
FIG. 1 is a schematic representation of a layered structure which forms a stampable sheet of this invention upon lamination.

Referring to FIG. 1, a preferred embodiment is shown. A primary resin layer (1) comprises one or more thermoplastic resin layers. Support film (3) also comprises one or more films of thermoplastic resin. Fibers (2) penetrate support film (3) with short ends facing resin layer (1). A minor portion of the fibers are on the surface side (5), which provides a surface of improved smoothness for stampable sheet. A major portion of the fibers are on the body side (4) of support film (3), which provides the surface of standard smoothness for the stampable sheet.

Laminating the layered structure of FIG. 1 provides a stampable sheet structure within the scope of this invention. This laminated structure comprises a thermoplastic resin matrix and a continuous reinforcing fiber network positioned to enhance the smoothness of at least one side of said stampable sheet. This positioned fiber network is provided by a mat of reinforcing fibers supported on a thermoplastic resin film. In the preferred embodiments, this fiber network is positioned to enhance the smoothness of both surfaces of said stampable sheet. This occurs where the layered structure of FIG. 1 is repeated to provide both surfaces of the stampable sheet with enhanced smoothness. Where the thermoplastic resin is opaque, it is possible to produce stampable sheets with no visible fibers on the surface of enhanced smoothness. In the examples below, the smoothness of the stampable sheet is shown to be improved by a decrease in the quantitative value "u in." (microinches) of about 10 to 50. Other methods of measurement may show a different level of improvement for the same sample. In addition, greater enhancement in smoothness is expected for other embodiments of this invention.

Figure 2:
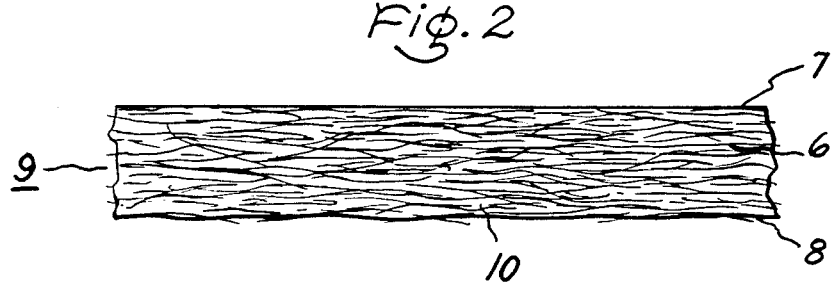
FIG. 2 is a schematic representation of a stampable sheet within the scope of this invention obtained from the layered structure of FIG. 1.

Referring to FIG. 2, a stampable sheet (9) obtained from the layered structure of FIG. 1 is shown. The uniformly distributed reinforcing fiber network (6) is surrounded by the thermoplastic resin matrix (10). Surface (8) is of standard smoothness while surface (7) is of enhanced smoothness.

Thermoplastic resins suitable for use herein include polycarbonates; polyamides; polyesters; poly(phenylene oxides); poly(etherimides); polyolefins, including polystyrenes, polypropylenes, ABS resins, polyethylenes and polyacrylates; epoxy resins; poly(phenylene sulfides); polysulfones; polyurethanes, and the like, including blends, block copolymers, and random copolymers thereof. These resinous materials meet the principle criteria that they may be extruded into sheet or film and impregnated into a fiber mat to form a resin matrix. Preferred thermoplastic resins for use herein are those which are readily available on the market. and known for strength and toughness.

One preferred thermoplastic resin is polycarbonate resin. Suitable polycarbonate resins can be prepared by reacting a dihydric phenol with a carbonate precursor, such as phosgene, a haloformate or a carbonate ester. Generally speaking, such carbonate polymers may be typified as possessing recurring structural units of the formula:

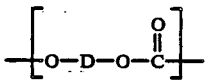

wherein D is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. The preferred polycarbonate resin for use herein is a homopolymer derived from 2,2-bis(4-hydroxyphenyl)propane and a carbonate precursor.

These aromatic polycarbonates can be manufactured by known processes. For example, a dihydric phenol can be reacted with a carbonate precursor, such as phosgene, in accordance with methods set forth in U.S. Pat Nos. 4,018,750 and 4,123,436; or transesterification processes may be used such as are disclosed in U.S. Pat. No. 3,154,008, as well as other processes known to those skilled in the art.

Also included within the term "polycarbonate" are block copolymers having polycarbonate blocks and blocks of a second polymer, for example, polyether or polydiorganosiloxane. Poly(diorganosiloxane-polycarbonate) block copolymers are well known and described in U.S. Pat. Nos. 3,189,662; 3,819,744; 3,821,325; and 3,832,419; which are incorporated herein by reference. Poly(ether-carbonate) block copolymers are extensively described in U.S. Pat. No. 3,030,335 and J. Poly Sci., Part C, No. 4, pgs 707-730, also incorporated herein by reference.

Another preferred thermoplastic resin is polyester resin polymerized from diacids and diols. The diacid may be an aliphatic difunctional carboxylic acid, but is preferably an aromatic difunctional carboxylic acid. The diols may be aliphatic diols, cycloaliphatic diols, or dihydric phenols. Examplary aliphatic difunctional carboxylic acids are sebacic acid, adipic acid, fumaric acid, succinic acid, etc. Examplary aromatic difunctional carboxylic acids are isophthalic acid and terephthalic acid. Examplary diols include ethylene glycol, propylene glycol, butylene glycol, 1,6-hexanediol, neopentyl glycol, etc. as aliphatic diols, and 1,4-cyclohexanedimethanol as cycloaliphatic diols. Dihydric phenols are monomuclear and polynuclear aromatic compounds, containing as functional groups two hydroxy radicals, each of which is attached directly to a carbon atom of an aromatic nucleus.

Especially preferred polyesters for use herein include the polyarylates, which are polymerized from an aromatic difunctional carboxylic acid, and a dihydric phenol; the poly(alkylene terephthalates), which include poly(ethylene terephthalate) and poly(butylene terephthalate); and the poly(cycloalkylene terephthalates), which include poly(1,4-cyclohexanedimethanol terephthalate) and copolymers thereof containing ethylene glycol. The polymerization of these polymers is not critical to the present invention and is well known to persons skilled in the art.

Another preferred thermoplastic resin is polyamide resin. Suitable polyamides may be obtained by polymerizing a monoamino-monocarboxylic acid or a lactam thereof having at least 2 carbon atoms between the amino and carboxylic acid group; or by polymerizing substantially equimolar proportions of a diamine which contains at least 2 carbon atoms between the amino groups and a dicarboxylic acid; or by polymerizing a monoaminocarboxylic acid or a lactam thereof as defined above together with substantially equimolecular proportions of a diamine and a dicarboxylic acid. The dicarboxylic acid may be used in the form of a functional derivative or equivalent thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups and in the case of lactones, said carbon atoms forming a ring with a —CO—NH— group. As particular examples of aminocarboxylic acids and lactams there may be mentioned: aminocaproic acid, butyrolactam, pivalolactam, caprolactam, capryl-lactam, enantholactam, undecanolactam, dodecanolactam and 3- and 4-aminobenzoic acids.

Diamines suitable for use in the preparation of the polyamides include the straight chain and branched, alkyl, aryl and alkyl-aryl diamines. Such diamines include, for example, those represented by the general formula:

wherein n is an integer of from 2 to 16, such as trimethylenediamine, tetramethylenediamine, pentamethylenediamine, octamethylenediamine and especially hexamethylenediamine, as well as trimethyl hexamethylene diamine, meta-phenylene diamine, para-phenylene diamine, meta-xylene diamine, para-xylene diamine and the like.

The dicarboxylic acids may be aromatic, for example isophthalic acid and terephthalic acid, or aliphatic dicarboxylic acids of the formula:

HOOC—Z—COOH wherein Z represents a divalent aliphatic group containing at least 2 carbon atoms. Examples of such acids are sebacic acid, octadecanoic acid, suberic acid, glutaric acid, pimelic acid, and adipic acid.

Yet another preferred thermoplastic resin is poly(phenylene-oxide) resin having repeated units of the formula:

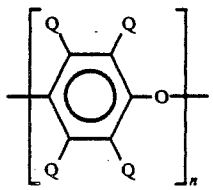

wherein Q may be the same or different and selected from the group consisting of hydrogen, halogens, hydrocarbon radicals, hydrocarbonoxy radicals, halohydrocarbonoxy radicals; and n is an integer of at least about 20 and usually at least 50.

In general, these polymers are self-condensation products of monohydric, monocyclic phenols produced by reacting phenols with oxygen in the presence of complex metal catalysts. Suitable procedures for their preparation are disclosed in U.S. Pat. Nos. 3,306,874; 3,306,875; 3,257,357; and 3,257,358; which are incorporated herein by reference.

Phenolic monomers from which the polyphenylene ether resins can be made include, but are not limited to: 2,6-dimethylphenol; 2,6-diethylphenol; 2,6-dibutylphenol; 2,6-dilaurylphenol; 2,6-dipropylphenol; 2,6-diphenylphenol; 2-dimethyl-6-ethylphenol; 2,6-dimethoxyphenol; 2,3,6-trimethylphenol; 2,3,5,6-tetramethylphenol; 2,6-diethoxyphenol.

Generally, the poly(phenylene-oxides) are blended with a poly(vinyl aromatic) to produce a usable molding or extruding composition. A preferred poly(vinyl aromatic) is polystyrene.

The reinforcing fiber mat for use herein has two necessary component structures, i.e. the reinforcing fibers and a thermoplastic resin support film onto which these fibers are anchored. The reinforcing fiber mat may be characterized by having the majority of the fibers by weight i.e., a major portion, on one side of the internal support film. This is referred to as the body side of the support film since this side provides an unfinished surface of standard smoothness. Thus, the reinforcing fiber mat should have, on the body side of the internal support film from about 55 to about 99 percent of the fibers by weight, and preferably, from about 85 to about 99 percent of the fibers by weight, as indicated above.

The reinforcing fibers used herein may be crosslinked organic fibers such as polyester fibers, polyamide fibers, polyimide fibers, etc.; conductive fibers such as stainless steel fibers, nickel coated carbon or glass fibers, nickel fibers, etc.; carbon fibers; but for economic reasons, glass fibers are preferred. The most important characteristics for these fibers are high tensile strength, good flexibility, and small strand size.

The preferred glass fiber for use herein is used in the form of strands or bundles of filaments which are at least about 1.0 inch in length. The individual glass strands or bundles may be comprised of about 20 to about 2000, and preferably about 100 to about 1000 filaments. Each filament may be about 0.00020 to about 0.001 inch, preferably about 0.00025 to 0.00085 inch in diameter. In the case of glass fibers, the reinforcing fibers of the reinforcing fiber mat may have a weight of from about 0.3 to about 10 ounces per square foot.

The reinforcing fiber component is readily distinguishable from other forms of fibrous reinforcement because of the random web-like, or swirl arrangement of the fibers, and should therefore not be confused with woven types of reinforcement such as glass cloth, woven roving, woven scrim, and the like. The reinforcing fiber component is also readily distinguishable from short chopped fiber reinforcement. Short chopped fiber reinforcement is most beneficial in mean lengths from about 0.01 inch to 0.85 inch and preferably from about 0.015 to 0.75 inch in mean length.

The thermoplastic support film may be either a film, screen, or randomly patterned web-like structure which will melt or disintegrate in the laminating process for forming the stampable sheet to release the reinforcing fibers. Of course, since it is desirable to have the support film melt or disintegrate in such laminating process, then a thermoplastic resin with a melting point below the temperature of lamination is a desirable material for the manufacture of the film. Suitable thermoplastics for use in the support film are those mentioned above for use in the surface layer of thermoplastic resin. Preferably, the support film should be as thin as possible having only sufficient thickness to support the fibers and not to tear or substantially stretch and lose its shape in processing. Greater thickness of the support film may be useful but it should not be of such excessive thickness that it is difficult to melt or disintegrate in the laminating process, that it is difficult to penetrate it with glass, or that it simply contains too much thermoplastic resin, for example, where desired properties of the stampable sheet cannot be obtained due to dilution caused by the support film. Preferably, the support film has a thickness of less than 50 mils and most preferably, a thickness of from about 0.5 to about 20 mils.

The reinforcing fiber mat may be produced by a process where the reinforcing fibers are made to penetrate the thermoplastic support film in such a way that the majority of the fibers by weight remain substantially on one side, i.e. on the body side of the support film. Not all fibers need to penetrate the support film but at least a sufficient number of fibers need to penetrate the film that the fibers are securely held to the support film and that the surface of the stampable sheet is improved. Preferably, the fibers are made to penetrate the film in such a way that the percentage of fiber ends on the body side of the support film is substantially equal to or greater than the weight percentage of the fibers on that side.

A reinforcing fiber mat, as preferred herein, may be produced, for example, by use of a process that needles the fibers through the support film. In the practice of the needling process, fibers are held to one side of a support film and from the opposite side, barbed needles are inserted through the film and withdrawn from the same direction. Upon withdrawal, the barb of the needles catch random strands of glass and pull these strands though the support film. By twisting the needle, moving the support film, or otherwise, the glass strands may be removed from the barb at the point where an appropriate amount of glass has been drawn through the support film. The density of needle penetration through the support film generally runs from about 25 to about 450 penetrations/in$^2$. In this method of producing the reinforcing fiber mat, the fiber ends are roughly distributed on either side of the support film in the same proportion as the fiber weight, since a nearly random sample of the fibers is pulled through the support film by the barb.

Persons skilled in the art may be able to imagine other ways to produce the reinforcing fiber mat as described above. Herein, the method of producing the mat is not critical so long as the fibers are supported by the mat in the layered structure.

The stampable sheet herein is produced from a layered structure which is laminated under heat and pressure. According to the present invention, the layered structure is produced by bringing into planar contact one or more thermoplastic resin layers or sheets with a reinforcing fiber mat. It is critical to obtaining improved smoothness that the reinforcing fiber mat be positioned with the body side of the thermoplastic support film opposite the resin layer. Restated, the reinforcing fiber mat should be arranged so that the majority of the fibers by weight of said mat are positioned on the side of the thermoplastic support film opposite the resin layer.

The thickness of both the thermoplastic resin layers of the surface layer and the glass density of the reinforcing fiber mat can vary widely and are determined by the desired size of the finished article, the desired properties of the finished article, and the relative thicknesses and glass density. Thermoplastic layers having a thickness of from 10 to 125 mils are common. Persons skilled in the art of stampable sheet can easily determine proper thickness and glass density. Generally, the concentration of fiber in the stampable sheet should range from about 5% to about 60% by weight of total fiber and thermoplastic resin content.

The layered structure can be repeated in a symmetrical fashion and laminated to produce a stampable sheet having smoother surfaces on two sides; for example, a layered structure having a resin layer/reinforcing fiber mat/reinforcing fiber mat/resin layer construction. Of course, there may be thermoplastic resin layers and other common reinforcing layers placed on the body side of the reinforcing fiber mat, or additional thermoplastic sheets and common reinforcing layers as a central core; for example, a central core to the above mentioned dual side layered structure. It is only critical that the instantly described resin layer and reinforcing fiber mat form the external portion of the laid-up structure.

The layered structure may be constructed by any common means, for example, in a batch process where cut sheets of the various layers are manually or mechanically arranged in the correct order or in a continuous process where continuous sheets of each layer are brought into parallel contact. Efficiency dictates the use of a continuous process but the method for forming the layered structure is not critical to the invention.

The layered structure is laminated under pressure and at temperatures above the melt temperature of the thermoplastic resin layer and any other thermoplastic layers in the lid-up structure, and above the melt or disintegration temperature of the thermoplastic support film. The pressure should be sufficient to force the thermoplastic melt to flow freely into the reinforcing fiber mat and to consolidate the layered structure into a congruous stampable sheet.

Heat and pressure may be applied to the layered structure in a simple press apparatus which is generally used in a batch operation or by passing the layered structure through a roller apparatus which is generally associated with a continuous operation. A suitable roller apparatus includes not only simple paired rollers between which the layered structure is passed, but also paired continuous belts which are passed over several rollers and which provide some area of uninterrupted contact under heat and pressure.

Of course, surface quality is a function of several variables, including the surface quality of the press or roller means used to apply heat and pressure. Care should be taken that improvement to surface quality which may be obtained as taught herein is not masked over by improper press or roller means surface quality.

The stampable sheet of the present invention may be subsequently stamped into shaped articles. Stamping is generally performed at temperatures below but approaching the melt temperature of the major thermoplastic constituent of the stampable sheet. Persons skilled in the art can readily judge a suitable temperature based upon the thermoplastic content and including other additives, such as plasticizers. Since stamping is performed below melt temperature, the surface characteristics of the stampable sheet are substantially transferred to the shaped article.

In a preferred method of stamping, the stampable sheet is passed through an oven on a continuous belt where it is heated to the appropriate temperature. Upon passing out of the oven, the heated sheet is placed into a stamping press and stamped with a highly polished and chrome plated die at an appropriate die temperature, under the appropriate pressure.

DESCRIPTION OF THE PREFERRED EMBODIMENTS

The following examples illustrate the preparation of certain compositions within the scope of the invention. They are not to be construed to limit the invention in any manner whatsoever.

Tests

Surface roughness is measured with a SURTRONIC 3 meter manufactured by Taylor Hobson Limited and reported in microinches, which is a measurement of the average distance between the lowest point and the highest point on the surface and is analogous to an amplitude. Following calibration, ten measurements are made across different areas of the test surface by placing the motor driven diamond stylus of the meter on the oil and dirt-free surface and allowing it to traverse across. If the measurement is an obvious outlier, i.e. greater than 15 microinches in deviation from the mean, it is ignored. The reported surface roughness is the average of ten readings.

| Materials | |
|---|---|
| Polycarbonate (PC) | poly(bisphenol A-carbonate), LEXAN 121 resin, manufactured by General Electric Company, Pittsfield, MA. |
| Polyester | poly(butylene-terephthalate) VALOX 310 resin, manufactured by General Electric Company, Pittsfield, MA. |
| Polyester/Polycarbonate (PBT/PC) | 50/50 weight ratio blend of a poly(butylene-terephthalate)/poly(bisphenol A-carbonate), XENOY 1600 resin, manufactured by General Electric Company, |

| | Materials |
|---|---|
| Lofty Glass Mat | Pittsfield, MA. Continuous strand glass mat having a density of 2 oz/ft$^2$, M-8608 mat manufactured by Owens Corning Fiberglass. |
| Needled Glass Mat | Glass mat having 67% 9 in. fibers and 33% 1-2 in. fibers needled through a 4 mil webbed poly(ethylene-terephthalate) support film at a density of 2 oz/ft$^2$ 110 needles/in$^2$ and with approximately 99% by weight of fibers on the body side of film, manufactured by Fiberglass Industries. |

EXAMPLES 1-6

Layered structures were formed having layers of the compositions shown Table 1 in the order of columns A/B/C/D/E. Where layers B and D were needled glass mat, the side of the support film having the majority of fibers by weight, i.e. the body side of the support film was positioned facing and adjoining layer C. The layered structures were laminated as continuous sheets, 24 in. in width, into continuous stampable sheet 100 mil in thickness which were cut into 3-5 ft. lengths. Lamination was performed on a Sandvik double belted lamination press at a feed rate and temperature profile shown in Table 1. Lamination pressure was about 3.3 bar and maximum temperature within the laminate is the melt temperature shown. Nominal glass content of the stampable sheet was 35% by weight where lofty glass mat was employed and 38% by weight where needled glass mat was employed. Surface roughness was measured on a specimen of each example and reported in Table 1.

As seen therein, stampable sheet produced from properly positioned needled glass mat has an improved surface when compared to identical sheet produced from lofty glass mat.

ing the support film and positioned by said support film, a major portion of said long fibers being positioned on one side of said support film, a minor portion of said long fibers being positioned on an opposite side of said support film, said minor portion of fibers being positioned adjacent said surface layer.

2. A fiber reinforced stampable sheet as in claim 1 wherein the thermoplastic resin support film has a thickness less than 50 mils.

3. A fiber reinforced stampable sheet as in claim 1 wherein the fibers of said reinforcing mat have an average length of at least about 1.0 inch.

4. A fiber reinforced stampable sheet as in claim 1 wherein said minor portion is from about 1% to about 45% by weight of said fibers.

5. A fiber reinforced stampable sheet as in claim 1 wherein said minor portion is from about 1% to about 15% by weight of said fibers.

6. A fiber reinforced stampable sheet as in claim 5 wherein said fibers are selected from the group consisting of cross-linked organic fibers, conductive fibers, carbon fibers, and glass fibers.

7. A fiber reinforced stampable sheet as in claim 6 wherein said fibers are glass and are of an average length of at least about 1.0 inch.

8. A fiber reinforced stampable sheet as in claim 7 wherein the fibers comprises bundles of 20 to about 2000 glass filaments.

9. A fiber reinforced stampable sheet as in claim 6 wherein said reinforcing fiber mat has a weight of about 0.3 to about 10 ounces per square foot.

10. A fiber reinforced stampable sheet as in claim 5 wherein the thermoplastic resin support film is comprised of a thermoplastic resin with a melting point below the melting point of the thermoplastic resin support layer.

11. A fiber reinforced stampable sheet as in claim 5 wherein said thermoplastic support film and thermoplastic resin layer are each comprised of a thermoplastic resin independently selected from the group consisting of polycarbonates, polyamides, polyesters, poly(phenylene oxides), poly(etherimides), polyolefins, epoxy resins, poly(phenylene sulfides), polysulfones, polyurethanes and mixtures thereof.

12. A fiber reinforced stampable sheet as in claim 5 wherein said thermoplastic film has a thickness of from about 0.5 to 20 mils.

TABLE 1

| Example | LAYERS A | B | C | D | E | Feed Rate m/min | Melt Temp °C. | ZONE TEMPERATURES °C. | | | | | Surface Roughness microinches |
|---|---|---|---|---|---|---|---|---|---|---|---|---|---|
| 1 | 20 mil PC Film | Lofty Glass Mat | 35 mil PC Film | Lofty Glass Mat | 20 mil PC Film | 0.3 | 290 | 310 | 300 | 300 | 10 | 15 | 36.5 |
| 2 | 20 mil PC Film | Needled Glass Mat | 35 mil PC Film | Needled Glass Mat | 20 mil PC Film | 0.36 | 288 | 310 | 300 | 300 | 10 | 18 | 17.7 |
| 3 | 20 mil PBT Film | Lofty Glass Mat | 35 mil PBT Film | Lofty Glass Mat | 20 mil PBT Film | 0.5 | 276 | 305 | 292 | 294 | 10 | 18 | 118.3 |
| 4 | 20 mil PBT Film | Needled Glass Mat | 35 mil PBT Film | Needled Glass Mat | 20 mil PBT Film | — | 272 | 300 | 288 | 290 | 8 | 12 | 95.1 |
| 5 | 20 mil PBT/PC Film | Lofty Glass Mat | 35 mil PBT/PC Film | Lofty Glass Mat | 20 mil PBT/PC Film | 0.45 | 276 | 300 | 288 | 288 | 10 | 12 | 48.9 |
| 6 | 20 mil PBT/PC Film | Needled Glass Mat | 35 mil PBT/PC Film | Needled Glass Mat | 20 mil PBT/PC Film | 0.45 | 280 | 300 | 288 | 290 | 8 | 12 | 32.5 |

What is claimed is:

1. A fiber reinforced stampable sheet obtained by laminating (a) a thermoplastic resin surface layer and (b) a reinforcing fiber mat comprising (i) a thermoplastic resin support film having a melting point below the temperature of lamination and (ii) long fibers penetrat- 13. A fiber reinforced stampable sheet as in claim 1 wherein the percentage of fiber ends on the side of said thermoplastic support film is about equal to or greater than the weight percentage of fibers on that side.

14. A fiber reinforced stampable sheet as in claim 13 wherein the fibers of said reinforcing fiber mat are needled through the thermoplastic support film.

15. A fiber reinforced stampable sheet as in claim 1 wherein the concentration of fibers ranges from about 5% to about 60% by weight of the total weight of fiber reinforced stampable sheet.

16. A fiber reinforced stampable sheet as in claim 1 wherein multiple thermoplastic resin support layers and reinforcing fiber mats are laminated.

17. A fiber reinforced stampable sheet as claimed in claim 1 wherein said thermoplastic resin surface layer comprises a thermoplastic resin selected from a group consisting of polycarbonate resins and polycarbonate/polyester resin blends.

18. A fiber reinforced stampable sheet as claimed in claim 17 wherein said side surface layer has a surface roughness of at most about 32.5 microinches.

* * * * *